Aug. 9, 1966 K. SCHLESINGER 3,265,926

IMAGE FIELD FLATTENER FOR IMAGE CONVERTER TUBES

Filed Sept. 16, 1963 2 Sheets-Sheet 1

INVENTOR:
KURT SCHLESINGER,

BY James J. Lichiello
HIS ATTORNEY.

INVENTOR:
KURT SCHLESINGER,
BY James J. Lichiello
HIS ATTORNEY.

United States Patent Office 3,265,926 Patented August 9, 1966

3,265,926
IMAGE FIELD FLATTENER FOR IMAGE CONVERTER TUBES

Kurt Schlesinger, Fayetteville, N.Y., assignor to General Electric Company, a corporation of New York Filed Sept. 16, 1963, Ser. No. 309,172
16 Claims. (Cl. 315—16)

This invention relates to image converter tubes and, in particular, to an electron-optical image field flattener for electrostatic image converter tubes.

Although electromagnetic image converter tubes enable image formation between two spaced flat planar surfaces, electrostatic image converter tubes have required spherically convex cathode surfaces to form an image on a spaced planar target with minimum aberration. The curved cathode surface is necessitated by the curvature of the prevailing electrostatic fields. Difficulties are encountered when a conventional optical camera lens is employed to focus an image on a spherically convex surface. Area focusing of the image requires an external optical field flattener. Such field flatteners have been fabricated, for example, from fiber optics and are expensive as well as resolution-limiting. The present invention obviates curved cathode surfaces in electrostatic image converter tubes.

It is an object of the invention to provide an improved electron optical system in an electrostatic image converter tube.

It is a further object of the invention to provide an internal electron-optical image field flattener in an electrostatic image converter tube.

It is another object of the invention to provide an electron optical system in an electrostatic image converter tube which enables image formation between two spaced planar surfaces with a minimum of aberration.

Briefly stated, in accordance with one preferred and illustrated embodiment of the invention, the cathode lens section of an image converter tube is provided with an internal, electron-optical, image field flattener comprising two fine mesh, perforate or grid electrodes and two ring electrodes. The first mesh electrode is planar or flat and is positioned adjacent a planar cathode of the image converter tube, the planes of the cathode and first mesh electrode being parallel to each other and perpendicular to the tube axis. The ring electrodes are cylindrical and coaxial with the tube axis and are successively spaced from the first mesh electrode along the tube axis. The second mesh electrode is convex with the convex curvature extending or protruding toward the flat cathode. The first mesh electrode is maintained at a high positive potential with respect to the grounded cathode. The second mesh electrode is also maintained at a high positive potential while the ring electrodes are depressed in potential with respect to both mesh electrodes, the resulting electrostatic field serving to electronically flatten the image field, permitting aplanatic operation of the cathode lens section. In one embodiment of the invention, a strong electrostatic focusing lens section is positioned along the tube axis adjacent the convex mesh electrode. This section is in tandem with the internal image field flattener of the invention and, in addition to focusing the image on the target, further reduces aberrations in the image on the target.

The subject matter of the invention is particularly pointed out and distinctly claimed in the concluding portion of the specification. The invention, however, both as to organization and method of operation may best be understood by reference to the following description taken in connection with the accompanying drawings in which:

Figure 1:
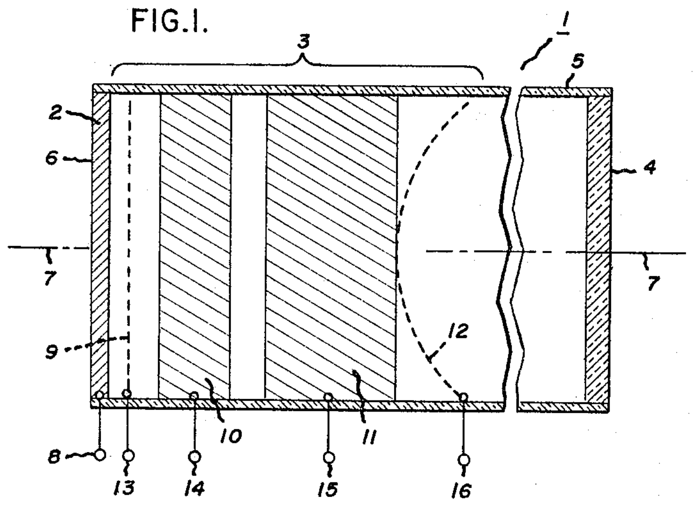
FIG. 1 is a sectional view of an image converter tube incorporating the internal electron-optical image field flattener of the invention.

With reference to FIG. 1, the electrostatic image converter tube 1 illustrated therein includes a cathode 2, a cathode lens section 3, and a target 4, with a suitable main focusing lens (not shown) positioned between cathode lens section 3 and target 4. A suitable cylindrical envelope 5, closed at its rearward end by cathode 2 and at its forward end by target 4, is provided to support the mentioned elements in their illustrated arrangement.

Cathode 2 is a photo-cathode which, as known in the art, emits electrons when an image is focused on its exterior surface 6, the emission of electrons from each elemental area being proportional to the intensity of the radiation, visible or invisible, impinging on that elemental area. The electron pattern emitted from cathode 2 is thus representative of the image focused on surface 6. Cathode 2 is, in accordance with a preferred embodiment of the invention, flat or planar, the plane of cathode 2 being substantially perpendicular to the longitudinal axis 7 of the image converter tube. Cathode 2 is preferably planar as in a disk with parallel front and rear surfaces and whose effective surfaces are coextensive or continuous throughout. The electrical potential of cathode 2 is controlled by the application of a suitable voltage to terminal connector 8.

Cathode lens section 3, i.e., the section enclosed by the envelope 5 between cathode 2 and the main focusing lens (not shown) of the image converter tube, includes a planar mesh 9, a first ring electrode 10, a second ring electrode 11 and a convex mesh 12, positioned in the order given along axis 7 between cathode 2 and target 4. The term mesh is employed in the specification and appended claims in its generic sense to denote generally open, perforate, foraminous, or grid-like structures. Meshes 9 and 12 and ring electrodes 10 and 11 comprise the internal, electron-optical, image field flattener of the invention whereby aplanatic operation is achieved in an electrostatic image converter tube employing a planar cathode and target. Cathode mesh 9 is a high-resolution electrode of fine mesh construction which is positioned slightly spaced from cathode 2 along axis 7 and toward target 4, the defined plane of mesh 9 being substantially parallel to the defined plane of cathode 2. Electrical connection is made to mesh 9 by means of a suitable terminal connector 13.

Ring electrodes 10 and 11 are successively spaced axially along axis 7 between planar mesh 9 and convex mesh 12. Ring electrodes 10 and 11 are substantially cylindrical and coaxial with axis 7 and may be formed by a coating of electrically conductive material on the interior surface of envelope 5. Electrical terminal connections 14 and 15 are connected to ring electrodes 10 and 11 respectively.

Convex mesh 12 is axially spaced from ring electrode 11 toward target 4 along axis 7 of the image converter tube. Convex mesh 12 is a low-resolution mesh with its convex curvature extending or projecting toward cathode 2. A plane which is tangent to mesh 12 at the point of intersection of mesh 12 and axis 7 is substantially parallel to cathode 2 and substantially perpendicular to axis 7. Electrical connection is made to mesh 12 by means of terminal connector 16.

Target 4 lies in a plane substantially perpendicular to axis 7 and may comprise any suitable target configuration and material, as known in the art. For example, target 4 may be a fluorescent screen which is excited by electron impact to radiate visible light, thus providing a visible image of the image focused on cathode 2, as represented by the electron pattern in the image converter tube. Target 4 may also be the target in the image section of an image orthicon, and cathode 2 along with cathode lens section 3 may comprise the image section. A suitable electrostatic main focusing lens (22 in FIG. 5) is positioned along axis 7 between cathode lens section 3 and target 4 to focus the image on target 4.

In operation, terminal 8 of cathode 2 is maintained at ground potential. Mesh 9, which serves as the first anode, is maintained at a positive potential with respect to cathode 2. The potential applied to mesh 9 at terminal 13 may be termed the cathode injection voltage. Mesh 9 thus accelerates the electrons emitted from the surface of cathode 2 and provides high velocity electrons in the cathode lens section 3. Photoemission from each point on cathode 2 is confined within a cone with half-angle as defined by the equation:

$$\alpha=\sqrt{\frac{e_0}{E_{15}}} \qquad (1)$$

where $e_0$ is the peak emission velocity of the electrons from cathode 1 and $E_{15}$ is the cathode injection voltage applied to mesh 9. $e_0$ is a maximum of about 2 volts. Since the sharpness of the image obtained at target 4 is determined by the half-angle $\alpha$, it is desirable that $\alpha$ be small. Hence, the cathode injection voltage $E_{15}$ applied to mesh 9 should be large, e.g., in the order of 500 to 1000 volts. The required resolution of mesh 12 is also related to the half-angle $\alpha$ since each cone must cover more than one elemental area on mesh 12, in accordance with the well-known principles of mesh optics.

Convex mesh 12 is also maintained at a potential in the range of 500 to 1000 volts by means of a suitable voltage source connected to terminal 16. Ring electrodes 10 and 11 are depressed in potential with respect to meshes 9 and 12 by connection of suitable voltage sources to terminals 14 and 15. A saddle-shaped space potential gradient is thus provided along axis 7 between planar mesh 9 and convex mesh 12. The potentials applied to ring electrodes 10 and 11 may be varied to control the space potential gradient along axis 7. Image geometry and edge focus may thus be controlled to avoid barrel and pincushion effects and to provide a flat field of focus.

Figure 2:
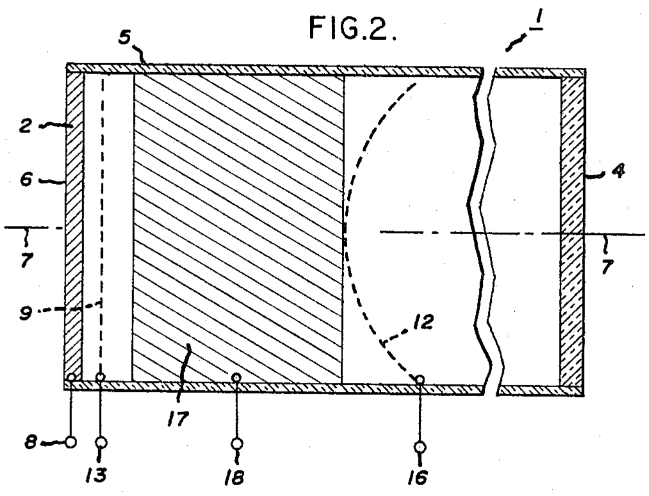
FIG. 2 is a sectional view of an image converter tube incorporating an internal image field flattener similar to that illustrated in FIG. 1.

Satisfactory operation of the image field flattener of the invention may also be obtained when ring electrodes 10 and 11 are combined into a single ring electrode 17 connected to terminal 18, as illustrated in FIG. 2. The FIG. 2 structure thus reduces, by one, the number of adjustable voltages required.

If the electron optical system of FIGS. 1 and 2 is used for photographic purposes, high shutter speeds may be attained by controlling the electron flow in cathode lens section 3 at mesh 9. Mesh 9 is maintained at a negative cut-off potential and the flow of electrons from cathode 2 to target 4 is abruptly initiated and maintained for a predetermined period by applying a high voltage, positive pulse to mesh 9, the exposure period being a function of pulse width.

In a conventional electrostatic image converter tube employing a planar cathode and a planar target, the paraxial and the off-axial electrons are focused in different planes by the cathode lens due to the curvature of the electrostatic field, the off-axial electrons being focused before the paraxial electrons. Consequently, the image field, as represented by the electron pattern, does not lie in a single plane and the entire image cannot be sharply focused on a planar target. An aberration called "curvature of field" is therefore present in the image as reproduced at the target. The electron optical system of the invention employed in the cathode lens section of an image converter tube flattens the image field by bringing the paraxial and off-axial electrons of the electron pattern into focus in the same plane, thus eliminating curvature of field and permitting image formation between two planar surfaces in an electrostatic image converter tube.

Aplanatic operation of the internal, electron-optical, image field flattener of the invention is achieved by means of convex mesh 12 which shapes the electrostatic field between meshes 9 and 12 within cathode lens section 3 so that the off-axial electrons are focused in the same plane as the paraxial electrons. Since the power of an electrostatic electron lens is inversely proportional to the square of the lens length, as discussed by Dr. Kurt Schlesinger in "Electron Trigonometry—A New Tool for Elecron-Optical Design," Procedings of the IRE, vol. 49, No. 10, October 1961, the power of the lens formed between meshes 9 and 12 is greatest at axis 7 and decreases progressively in a radial direction from axis 7. The lens thus tends to focus the paraxial electrons before the off-axial electrons. This effect compensates for the usual focusing of the off-axial electrons before the paraxial electrons in a conventional electrostatic image converter tube employing a planar cathode and a planar target.

Figure 3:
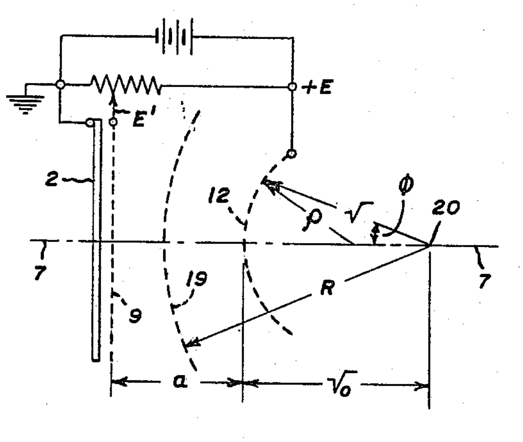
FIG. 3 illustrates diagrammatically the relationship between the image field flattener of the invention and an equivalent spherically convex cathode.

The field flattener of the invention may be analyzed mathematically as simulating a spherically convex cathode, as required in prior art image converter tubes. FIG. 3 illustrates diagrammatically, for purposes of analysis, the relationship between the electron-optical image field flattener of the invention and an equivalent spherically convex cathode. The reference numerals applied to the planar cathode 2, the planar mesh 9 and the convex mesh 12 in FIG. 3, are the same as those employed in FIG. 1, in order to simplify discussion. The equivalent spherically convex cathode simulated by the field flattener of the invention is indicated by reference numeral 19. The profile of the convex mesh 12 may be expressed as $$r_0-r=\frac{R}{g}\ (\sec.\ \phi-1) \qquad (2)$$

where $r_0$=distance from point 20 on axis 7 to the line tangent to mesh 12 at the point at which mesh 12 intersects axis 7

$r$=distance from point 20 to convex mesh 12

$R$=radius of curvature of simulated spherically convex cathode 19

$\phi$=angle between vector $r$ and axis 7

$$g=\frac{\sqrt{P}-1}{\sqrt{P}+1}$$

$$P=\frac{E}{E'}$$

$E$=potential on mesh 12

$E'$=potential on mesh 9

Equation 2 is the equation of a "conchoid."

The radius of curvature $\rho$ of the approximate spherical profile of convex mesh 12 is given as $$\rho=g\cdot R\left[1-\frac{a/R}{1+g}\right]^2 \qquad (3)$$

where $a$=distance between mesh 9 and the line tangent to mesh 12 at the point at which mesh 12 intersects axis 7

This equation which is only approximate yields the radius of curvature of convex mesh 12 required to simulate a spherically convex cathode 19 with a specified radius of curvature R. Equation 3 shows that convex mesh 12 must be more curved than the cathode which is to be simulated, i.e., $\rho<R$.

If the radius of curvature $\rho$ of convex mesh 12 and its distance $a$ from mesh 9 are known, the radius of curvature R of simulated cathode 19 may be expressed as $$R=\rho\left[\frac{1+\sqrt{1+\frac{4g}{1+g}\cdot\frac{a}{\rho}}}{2g}+\frac{a/\rho}{1+g}\right] \quad (4)$$

Figure 4:
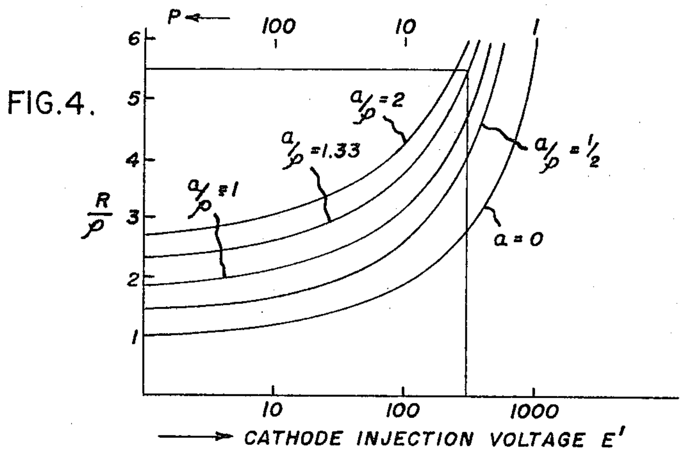
FIG. 4 illustrates in graphical form the voltage and dimensional relationships between the image field flattener of the invention and an equivalent spherically convex cathode.

Equation 4 is plotted in FIG. 4 for various ratios of $a/\rho$. These curves generally indicate that, for a given ratio $a/\rho$, R approaches $\rho$ as P approaches $\alpha$, and that R approaches $\alpha$ as P approaches 1. For a given cathode injection voltage E', $R/\rho$ increases as $a/\rho$ increases. With a cathode injection voltage of 300 volts and a convex mesh 12 having a radius of 1 inch, a spherically convex mesh 19 of 5.5 inches radius is simulated if distance $a$ is 1.33 inches, as illustrated in FIG. 4.

Figure 5:
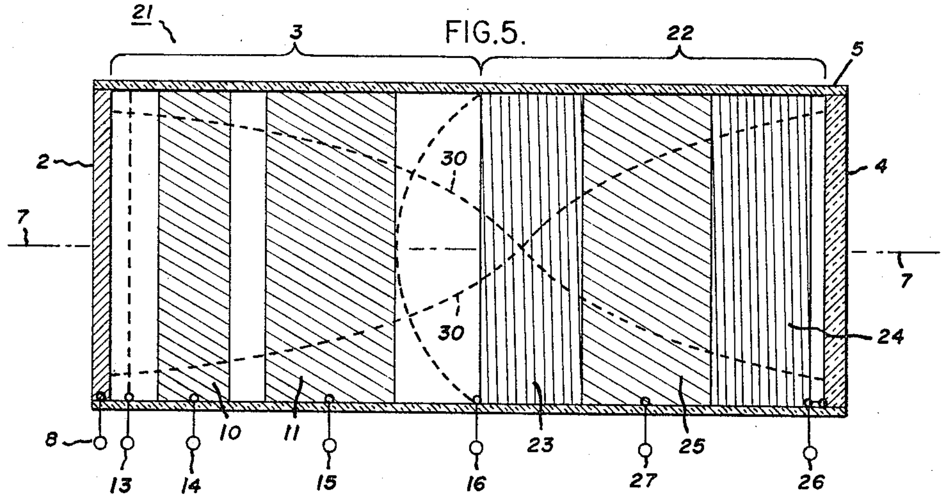
FIG. 5 is a sectional view of an image converter tube in accordance with the invention employing a strong electrostatic lens in conjunction with the internal field flattener of FIG. 1 to further reduce aberrations.

FIG. 5 illustrates a complete image converter 21 incorporating the image field flattener of the invention. The image converter 21 of FIG. 5 employs two lens sections 3 and 22 in tandem to form an electron-optical analogue of an optical orthoscopic doublet which is known to reduce aberrations in optical instruments, as described by Jenkins and White in Optics, section 9.11, pages 152–154, third edition, 1950. The FIG. 5 embodiment of the invention employs a planar cathode 2, an electron-optical image field flattener in the cathode lens section 3 as described with reference to FIG. 1, a planar target 4, and an envelope 5. The reference numerals used in FIG. 1 are applied to the common elements of the FIG. 5 embodiment in order to simplify description. In addition to the image field flattener of FIG. 1, the FIG. 5 embodiment includes a cylindrical spiral lens unit 22 coaxial with axis 7 of the image converter tube and positioned in tandem with cathode lens section 3 between cathode 2 and target 4. Spiral lens unit 22 comprises a first linear spiral electrode 23 and a second linear spiral electrode 24 electrically interconnected by a conductive band 25 having a width equal to that of the spiral electrodes. Spiral electrodes 23 and 24 may be formed by a spiral coating of electrical resistance material supported on or attached to the interior surface of envelope 5. Conductive band 25 may similarly be formed of a conductive material coated on the interior surface of envelope 5. The end of spiral electrode 23 (and the end of adjacent convex mesh 12) is connected to electrical terminal 16 while the end of spiral electrode 24 (and adjacent target 4) is connected to electrical terminal 26. Conductive band 25 is electrically connected to terminal 27.

Figure 6:
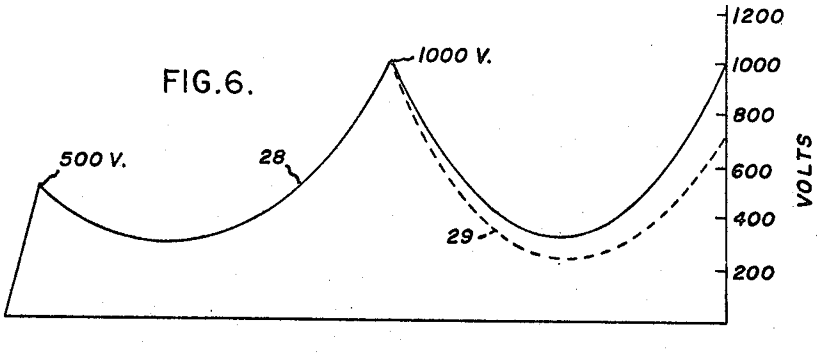
FIG. 6 illustrates the space potential gradient along the axis of the image converter tube illustrated in FIG. 5.

A potential in the range of that applied to terminal 16 is applied to terminal 26. A lower potential is applied to terminal 27 to depress the potential of conductive band 25 relative to the opposite ends of spiral electrodes 23 and 24, thereby producing a saddle-shaped space potential distribution within spiral lens unit 22 along axis 7. If acceleration of the electrons prior to impingement on target 4 is desired, the potential applied to terminal 26 is made higher than that applied to terminal 16. Electron deceleration is effected by applying a higher potential to terminal 16 than to terminal 26. The approximate space potential distribution along axis 7 for one set of voltages applied to terminals 8, 13, 14, 15, 16, 27 and 26 is illustrated by a curve 28 in FIG. 6. In this mode of operation spiral lens unit 22 is non-accelerating since mesh 12 and target 4 are at the same potential. Dashed line 29 indicates a decelerating mode which is useful in an image orthicon image section application. For greater image sharpness at target 4, as indicated by Equation 1, planar mesh 9 may be maintained at the same potential as mesh 12 and target 4, i.e., 1000 volts.

Since cathode lens section 3 and spiral lens unit 22 are both strong electrostatic lenses, a beam cross-over occurs as illustrated by dashed lines 30 in FIG. 5. The electron optical system of the invention illustrated is thus an analogue of an optical orthoscopic doublet and is corrective of geometric distortion in the same manner as the optical orthoscopic doublet. Experiments with the electron optical system of the invention illustrated in FIG. 5 have shown that the use of a strong electrostatic lens in conjunction with the electron-optical image field flattener illustrated in FIGS. 1 and 2 furnishes improved aplanatic operation, reducing curvature of the image field in addition to minimizing other aberrations, including geometric distortion.

In one exemplary and preferred practice of the teachings of this invention, cathode mesh 9 contained about 750 holes per linear inch, each hole being about 1.1 mil in diameter, with resultant transmission of about 68%. Convex field mesh 12 was of a spherical curvature having about 750 holes per linear inch, each hole being of about 0.75 mil diameter, and with resultant transmission of about 32%. Preferred meshes of this invention were made from thin copper sheet which is photoengraved to provide the required holes. These operative meshes provided good results in the practice of this invention.

Although the invention in its operation has been described with reference to specific embodiments, the invention is not to be limited to these embodiments. Many modifications will be obvious to those skilled in the art. It is thus intended that the invention be not limited to the particular details shown and described which may be varied without departing from the spirit and scope of the invention and the appended claims.

What I claim as new and desire to secure by Letters Patent of the United States is:

1. An electron-optical image field flattener for providing image formation between a planar cathode and a planar target in an electrostatic image converter tube, said image field flattener comprising:

(a) a planar mesh electrode spaced from said planar cathode along the axis of said image converter tube between said cathode and said target, (b) a convex mesh electrode spaced from said planar mesh electrode along said axis between said planar mesh electrode and said target, the convex curvature of said convex mesh electrode extending toward said cathode, (c) at least one ring electrode positioned along said axis between said planar and said convex mesh electrodes, and (d) electrical terminals connected to said planar and said convex mesh electrodes and to said ring electrodes for applying potentials thereto to provide an electrostatic lens between said planar and said convex mesh electrodes so that an image from said planar cathode is area focused on said planar target.

2. The electron-optical image field flattener of claim 1 in which said planar mesh is substantially parallel to said planar cathode and substantially perpendicular to said tube axis.

3. The electron-optical image field flattener of claim 1 in which a plane tangent to said convex mesh at the point of intersection of said convex mesh and said tube axis is substantially parallel to said cathode and substantially perpendicular to said tube axis.

4. The electron-optical image field flattener of claim 1 in which said ring electrode is cylindrical and coaxial with said tube axis.

5. The electron-optical image field flattener of claim 1 in which the radius of curvature $\rho$ of the spherical profile of said convex mesh is approximately:

$$\rho=g\cdot R\left[1-\frac{a/R}{1+g}\right]^2$$

where $R$=radius of curvature of the simulated spherically convex cathode $a$=distance between said planar mesh and the plane tangent to said convex mesh at the point of intersection of said convex mesh and said tube axis $$g=\frac{\sqrt{P}-1}{\sqrt{P}+1}$$

where $$P=\frac{E}{E'}$$

$E$=potential on said convex mesh
$E'$=potential on said planar mesh

6. The electron-optical image field flattener of claim 1 which includes means for applying a pulse to said planar mesh for abruptly initiating the flow of electrons from said cathode to said target and maintaining the electron flow for a predetermined period.

7. An electron-optical image field flattener for providing image formation between a planar cathode and a planar target in an electrostatic image converter tube, said image field flattener comprising:

(a) a planar mesh spaced from said planar cathode along the axis of said image converter tube between said cathode and said target, (b) a convex mesh spaced from said planar mesh along said axis between said planar mesh and said target, the convex curvature of said convex mesh extending toward said cathode, (c) first and second ring electrodes positioned in tandem along said axis between said planar and said convex meshes, and (d) electrical terminals connected to said planar and said convex meshes and to said ring electrodes for applying potentials thereto to provide an electrostatic lens between said planar and said convex meshes so that an image from said cathode is area focused on said target.

8. An electron-optical image field flattener for providing image formation between a planar cathode and a planar target in an electrostatic image converter tube, said image field flattener comprising:

(a) a planar mesh spaced from said planar cathode along the axis of said image converter tube between said cathode and said target, said planar mesh being substantially parallel to said planar cathode and substantially perpendicular to said axis, (b) a convex mesh spaced from said planar mesh along said axis between said planar mesh and said target, the convex curvature of said convex mesh extending toward said cathode and the plane tangent to said convex mesh at the point of intersection of said convex mesh and said axis being substantially parallel to said cathode and substantially perpendicular to said axis, (c) at least one cylindrical ring electrode coaxial with said axis and positioned between said planar and said convex meshes, and (d) electrical terminals connected to said planar and said convex meshes and to said ring electrode for applying potentials thereto to provide an electrostatic lens between said planar and said convex meshes so that an image from said cathode is area focused on said target.

9. The electron-optical image field flattener of claim 8 in which the radius of curvature of the spherical profile of said convex mesh is approximately:

$$\rho=g\cdot R\left[1-\frac{a/R}{1+g}\right]^2$$

where $R$=radius of curvature of the simulated spherically convex cathode $a$=distance between said planar mesh and the plane tangent to said convex mesh at the point of intersection of said convex mesh and said tube axis $$g=\frac{\sqrt{P}-1}{\sqrt{P}+1}$$

where $$P=\frac{E}{E'}$$

$E$=potential on said convex mesh
$E'$=potential on said planar mesh

10. The electron-optical image field flattener of claim 8 which includes means for applying a positive voltage pulse to said planar mesh for abruptly initiating the flow of electrons from said cathode to said target and maintaining the electron flow for a predetermined period.

11. An electron-optical image field flattener for providing image formation between a planar cathode and a planar target in an electrostatic image converter tube, said image field flattener comprising:

(a) a planar mesh spaced from said planar cathode along the axis of said image converter tube between said cathode and said target, (b) a convex mesh spaced from said planar mesh along said axis between said planar mesh from said target, the convex curvature of said convex mesh extending toward said cathode, (c) at least one ring electrode positioned along said axis between said planar and said convex meshes, (d) terminals connected to said planar and said convex meshes and to said ring electrode for applying potentials thereto to provide an electrostatic lens between said planar and said convex meshes, (e) an electrostatic electron lens positioned along said axis between said convex mesh and said target, and (f) electrical terminals connected to said electrostatic electron lens for energizing said lens to provide a strong electrostatic focusing field between said convex mesh and said target so that an image from said cathode is area focused on said target.

12. The electron-optical image field flattener of claim 11 in which said electrostatic electron lens comprises a cylindrical spiral lens unit coaxial with said tube axis.

13. An electron-optical image field flattener for providing image formation between a planar cathode and a planar target in an electrostatic image converter tube, said image field flattener comprising:

(a) a planar mesh spaced from said planar cathode along the axis of said image converter tube between said cathode and said target, said planar mesh being substantially parallel to said cathode and substantially perpendicular to said axis, (b) a convex mesh spaced from said planar mesh along said axis between said planar mesh and said target, the convex curvature of said mesh extending toward said cathode, and the plane tangent to said convex mesh at the point of intersection of said convex mesh and said axis being substantially parallel to said cathode and substantially perpendicular to said axis, (c) at least one cylindrical ring electrode coaxial with said axis and positioned between said planar and said convex meshes, (d) terminals connected to said planar and said convex meshes and to said ring electrode for applying potentials thereto to provide an electrostatic lens between said planar and said convex meshes, (e) an electrostatic electron lens positioned along said axis between said convex mesh and said target, and (f) electrical terminals connected to said electrostatic electron lens for energizing said lens to provide a strong electrostatic focusing field between said convex mesh and said target so that an image from said cathode is area focused on said target.

14. The electron-optical image field flattener of claim 13 in which the radius of curvature $\rho$ of the spherical profile of said convex mesh is approximately:

$$\rho = g \cdot R\left[1 - \frac{a/R}{1+g}\right]^2$$

where $R$=radius of curvature of the simulated spherically convex cathode $a$=distance between said planar mesh and the plane tangent to said convex mesh at the point of intersection of said convex mesh and said tube axis $$g = \frac{\sqrt{P}-1}{\sqrt{P}+1}$$

where $$P = \frac{E}{E'}$$

$E$=potential on said convex mesh $E'$=potential on said planar mesh

15. The electron-optical image field flattener of claim 13 which includes means for applying a positive voltage pulse to said planar mesh for abruptly initiating the flow of electrons from said cathode to said target and maintaining the electron flow for a predetermined period.

16. The electron-optical image field flattener of claim 13 in which said electrostatic electron lens comprises a cylindrical spiral lens unit coaxial with said tube axis.

No references cited.

DAVID G. REDINBAUGH, *Primary Examiner.*

T. A. GALLAGHER, *Assistant Examiner.*